Nov. 13, 1962 F. J. KESTEL 3,063,599
SEED-DROP MECHANISM FOR PLANTER
Filed Jan. 6, 1960 2 Sheets-Sheet 1

INVENTOR.
FREDERICK J. KESTEL
BY
Mead, Browne, Schuyler and Beveridge
ATTORNEYS

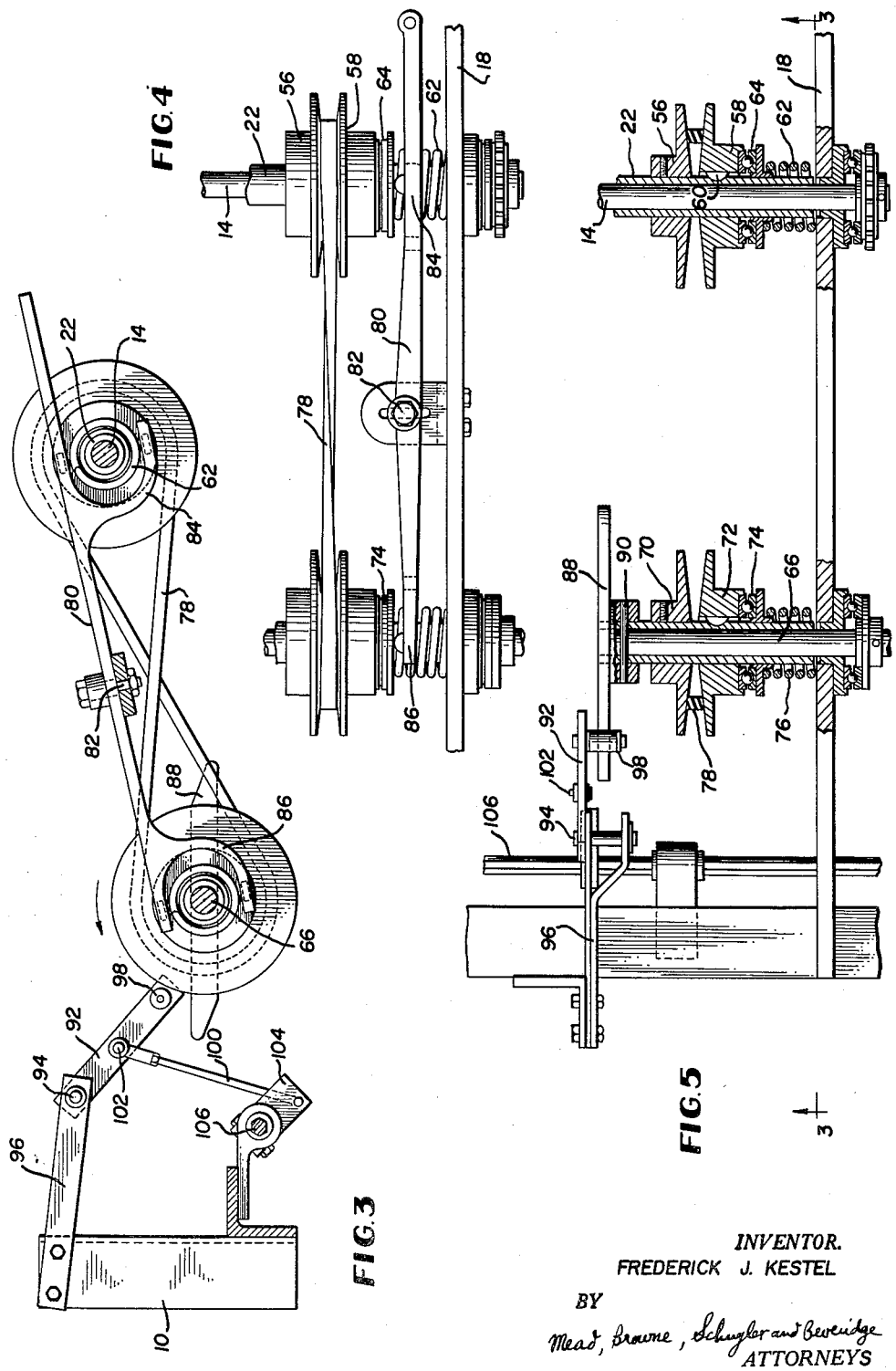

United States Patent Office 3,063,599
Patented Nov. 13, 1962

3,063,599
SEED-DROP MECHANISM FOR PLANTER
Frederick J. Kestel, Rte. 1, Box 44, New Lenox, Ill.
Filed Jan. 6, 1960, Ser. No. 845
2 Claims. (Cl. 222—177)

This invention relates to seed-drop mechanisms for corn planters or the like, and more particularly to a seed-drop mechanism in which the drop spacing may be varied as desired while the planter is being operated.

In the planting of corn, the field is initially prepared by forming hills which are spaced from each other at distances dependent in general upon the fertility of the soil. The seeds are then planted by driving or towing a planter over the field and dropping a selected number of seeds from the planter as the planter passes over each hill. In the usual case, the planter is provided with a number of seed dispensing hoppers which are actuated by knocker arms or other devices driven from the ground engaging wheels of the planter. Because of the direct drive coupling between the ground engaging wheel of the planter and the knocker arm, seeds are dispensed from the planter at fixed distances which are determined by the initial adjustment of the spacing of the knocker arms. Assuming that hills are formed on the field with a four foot spacing, the planter will be adjusted to dispense the desired number of seeds for each four feet of forward travel of the planter.

While the planter setting is precisely fixed and unvarying, the spacing between the hills is at best only approximate, and frequently accumulative error in hill spacing is built up in a manner such that it is almost impossible to deposit seeds accurately from the planter onto the hills.

It is therefore an object of my invention to provide a seed-drop mechanism for a corn planter of the like in which the distance between successive seed-drops may be continuously adjusted during operation of the planter.

Another object of my invention is to provide a seed-drop mechanism in which the spacing between successive seed-drops may be increased or decreased over a continuous range to compensate for varying hill spacing.

Still another object of my invention is to provide a planter which may be set to dispense a desired number of seeds per acre, and in which the spacing between successive seed-drops may be increased or decreased at will from the selected nominal spacing.

Other objects and advantages of my invention will become more apparent by reference to the following detailed description and to the accompanying drawings.

In the drawings:

FIG. 3 is a detail side elevational view, partially in section, of a variable speed drive mechanism employed on the planter of FIG. 1;

FIG. 4 is a detail top plan view of a portion of the structure shown in FIG. 3; and, FIG. 5 is a top plan view of the variable speed drive mechanism, partially in section, with certain parts omitted.

Figure 1:
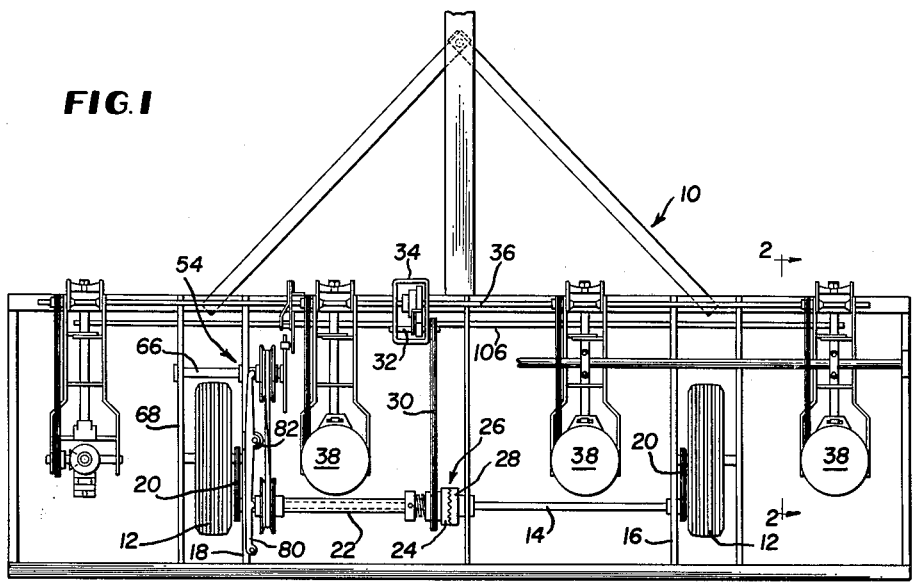
FIG. 1 is a top plan view of a planter embodying my invention with certain portions omitted or broken away.

Referring first to FIG. 1, the planter shown therein includes a rigid frame designated generally 10 upon which are mounted a pair of ground engaging wheels 12 which serve to carry frame 10 in a conventional manner. A shaft 14 is rotatably journaled in frame 10, as between frame members 16 and 18, and is coupled at each end to the adjacent wheel 12 by a chain and sprocket drive mechanism 20.

A sleeve 22 is rotatably supported upon shaft 14 and is rotatably coupled to an axially slideable member 24 of a clutch designated generally 26. A complementary toothed clutch member 28 is fixed to shaft 14 for rotation therewith. Suitable actuating mechanism (not shown) is employed to engage or disengage clutch 26, sleeve 22 being freely rotatable upon shaft 14 when the clutch is disengaged.

Member 24 of clutch 26 is coupled by a chain and sprocket mechanism 30 to the input shaft 32 of a stepped gear transmission assembly 34 mounted on the forward portion of a frame 10. The output shaft 36 of transmission 34 extends across the entire front portion of frame 10 and is employed to drive the seed plates of a well-known form of seed dispensing hopper assembly 38. As best seen in FIG. 1, and in the usual case, several hopper assemblies 38 are mounted on the planter.

Figure 2:
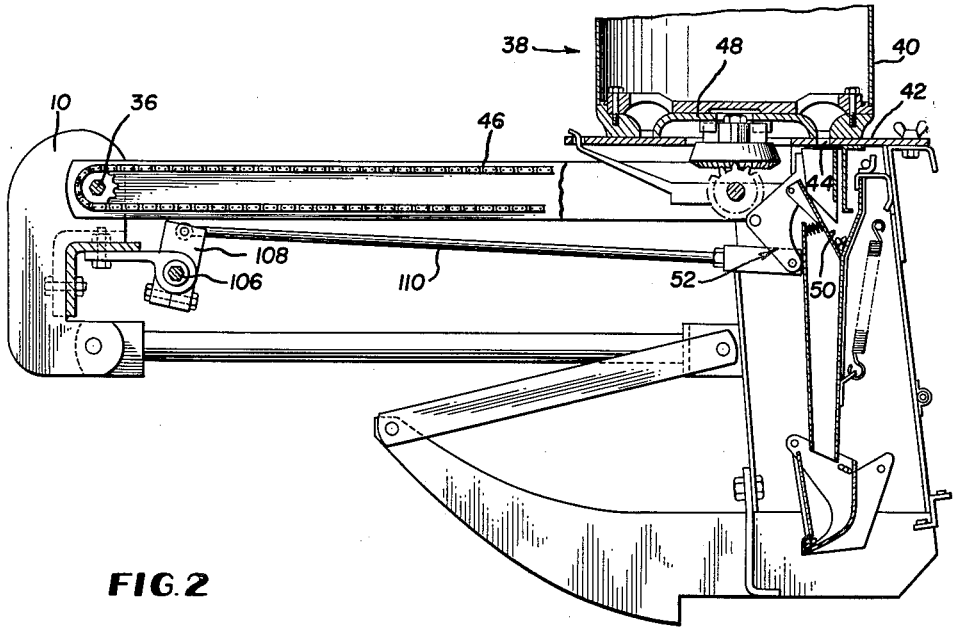
FIG. 2 is an enlarged cross-sectional view taken approximately on the line 2—2 of FIG. 1.

Referring to FIG. 2, each assembly 38 includes a hopper 40 closed at its lower end by a plate 42 having a limited number of dispensing openings 44. Shaft 36 is coupled by a chain and sprocket assembly 46 to drive a rotating seed plate 48 which releases seeds through opening 44 at a rate dependent upon the rate of rotation of shaft 36 which is in turn selected with respect to the rate of rotation of wheels 12 by the setting of transmission 34. Seeds released from hopper 40 fall into a trap 50 which is periodically actuated by a trip mechanism designated generally 52.

From the foregoing it is seen that with clutch 26 engaged, hopper 38 is operated to supply seeds to trap 50 at a rate directly dependent upon the rate of rotation of ground engaging wheels 12. In the prior art planters of which I have knowledge, trip mechanism 52 is likewise actuated by a direct drive coupling from the ground engaging wheels so that seeds are intermittently released from trap 50 at fixed distances of travel of the planter.

In order to permit variation of the periodic rate of actuation of trip mechanism 52, this trip mechanism is operated from the output shaft of a variable speed transmission designated generally at 54 (see FIG. 1) which is driven from wheels 12 but is adapted to steplessly vary the rate of actuation of trip mechanism 52.

Referring now to FIGS. 3–5, a preferred form of transmission adapted to achieve the objects of the invention takes the form of a Reeves drive which includes a first pulley cone 56 axially and rotatively fixed to sleeve 22. The opposed pulley cone 58 is mounted upon sleeve 22 for axial sliding movement relative to the sleeve at a rotatively fixed position, as by a key and slot coupling 60. Pulley 58 is spring biased towards fixed pulley 56 by a compression spring 62 which acts between frame member 18 and a thrust bearing 64.

A similar pulley arrangement is mounted upon a second shaft 66 rotatively supported between frame member 18 and frame member 68 (FIG. 1). The second pulley assembly includes a rotatively and axially fixed pulley cone 70, and axially slideable, rotatively fixed pulley cone 72, thrust bearing 74 and compression spring 76 cooperatively interrelated in the same fashion as described above with respect to the first pulley assembly which includes pulley cones 56 and 58. A transmission belt 78 is operatively engaged between the respective cones in a manner known to those skilled in the art.

Springs 62 and 76 are balanced so that each spring exerts an equal compressive force upon the axially movable pulley of the associated pulley assembly. The tension of transmission belt 78 acts to drive the axially movable pulley away from its associated fixed pulley and thus the forces exerted by the springs act in opposition to the forces exerted by the tension of the belt acting against the inclined pulley faces. In the absence of external forces, this causes the belt to force the opposed pulleys apart so that, normally, the radius at which the belt engages each pulley is equal on the respective sets of pulleys. Therefore, shaft 66 would normally be driven at the same rotative speed as shaft 14.

To vary the speed of rotation of shaft 66 with respect to the speed of rotation of shaft 14, a lever 80 is pivotally supported by a pivot pin 82 mounted upon fixed frame member 18. Pivot pin 82 is located midway between shafts 14 and 66. A pair of yokes 84 and 86 (see FIG. 3) are formed on lever 80 to engage the outer races of thrust bearings 64 and 74 respectively. Therefore, pivotal movement of lever 80 about pin 82 acts to drive one or the other of the axially movable pulleys 58 or 72 toward its associated fixed pulley. This action forces belt 78 radially outwardly of the set of pulleys which are compressed and the tension of the belt pulls the belt radially inwardly on the opposite pulley. Thus, as the effective radius of the belt on one set of pulleys is increased, its effective radius on the other set of pulleys automatically decreases. By this arrangement, the rotative speed of output shaft 66 may be steplessly varied above or below the rotative speed of shaft 14.

At one end of shaft 66, a knocker arm assembly 88 is rotatively and axially fixed to the shaft as by a pin connection 90 (see FIG. 5). An arm 92 is pivotally supported by a pivot pin 94 connected to an arm 96 rigidly mounted on frame 10. At the distal end of arm 92, a roller 98 is pivotally mounted upon the arm and projects axially from the arm into the path or plane of rotation of knocker arm assembly 88. An extensible rod 100 is pivotally connected at 102 to arm 92 and is pivotally connected at its opposite end to an arm 104 rotatively fixed to a shaft 106 which extends substantially across the entire front of the planter frame. Referring now to FIG. 2, at each seed hopper location, an arm 108 is rotatively fixed to shaft 106 and is coupled to the trip mechanism of the associated hopper assembly 38 by means of an elongate link 110.

Referring now to FIG. 3, upon each revolution of shaft 66, the opposed arms of knocker assembly 88 successively engage roller 98 to turn arm 92 about pivot 94. This turning movement is transmitted to shaft 106 by the link and arm connection 100, 104 and is similarly transmitted to the trip mechanism 52 by the respective arm and link connections 108—110. Each turning movement of shaft 106 actuates the trip mechanisms to dispense a selected number of seeds from trap 50 and since there are two opposed arms on the knocker assembly, the trip mechanisms will be actuated twice upon each revolution of shaft 66.

In operation, the planter is towed across a field on which hills have been prepared to receive the seeds from the planter. The hopper assemblies 38 are initially adjusted to feed seeds to traps 50 at a selected rate which will normally find a selected number of seeds being dropped into a trap for a given distance of the planter travel, as for example 4 feet. The selected distance corresponds to the nominal spacing of the hills. As explained above, hopper assemblies 38 are actuated by a direct drive from the planter wheels which includes chain and sprocket assembly 30, transmission 34, drive shaft 36, and chain and sprocket assembly 46.

The knocker arm assembly is then related to the nominal hill spacing by choosing an arm assembly having the desired number of radially projecting arms. In the embodiment shown in the drawing, the knocker arm assembly 88 includes two diametrically opposed arms which it may be assumed are related to the rate of rotation of wheels 12 in a fashion such that an 8 foot distance of forward travel of the planter is required to drive shaft 66 and the knocker arm assembly through a complete revolution. Thus with the two arm assembly shown in the drawings, seed trip mechanism 52 would be actuated by the knocker assembly at 4 foot intervals of travel of the planter. If, in the foregoing situation, it were desired to drop seeds each 2 feet of forward planter travel, a knocker arm assembly employing four symmetrically located radially projecting arms would be used.

With the foregoing initial settings made, the Reeves drive assembly is initially positioned to achieve a one-to-one speed ratio between shafts 14 and 66. As long as this one-to-one ratio is maintained, seeds will be dispensed from the seed traps 50 at 4 feet intervals as the planter moves across the field. In the case where the spacing between successive hills is less than the nominal 4 foot spacing, the operator manipulates lever 80 (by any suitable means, not shown) to increase the rotative speed of shaft 66, thus decreasing the interval between successive actuations of seed trip mechanism 52 by the knocker arm assembly. If the distance between successive hills begins to increase, the operator manipulates lever 80 to decrease the rotative speed of shaft 66 relative to shaft 14, thus increasing the spacing between successive actuations of the seed trip mechanisms.

Lever 80 may be directly manually controlled by the operator or suitable control linkage or cable systems may be provided to suit the construction of the particular planter upon which the invention is employed. The continuous or steplessly variable speed transmission provided by the Reeves drive assembly places control of the spacing between successive seed drops directly in the hands of the planter operator. In the cases where the crop being planted does not require the use of hills, the structure described above permits variation of the density of seeding to accommodate for differing degrees of fertility or drainage of the field being planted.

While I have described an exemplary embodiment of my invention, it will be apparent to those skilled in the art the disclosed embodiment may be modified. Therefore, the foregoing description is to be considered exemplary rather than limiting and the true scope of my invention is that defined in the following claims.

I claim:

1. In a planter having a frame, a ground engaging wheel supporting said frame, seed dispensing means mounted on said frame and operable when actuated to dispense a unit quantity of seed, and an actuating member rotatively supported on said frame and operable to periodically actuate said seed dispensing means at a cyclic rate dependent upon the rate of rotation of said member; the improvement comprising steplessly variable speed transmission means drivingly coupling said actuating member to said ground engaging wheel for rotating said actuating member at continuously variable rates of rotation relative to the rate of rotation of said ground engaging wheel to thereby vary the distance travelled by said planter between successive actuations of said dispensing means.

2. A planter comprising a frame, a ground engaging wheel supporting said frame, a seed hopper mounted upon said frame, a seed trap mounted upon said frame for receiving seed released from said hopper, wheel driven means in said hopper for periodically releasing seeds from said hopper to said trap at a cyclic rate proportional to the rate of rotation of said ground engaging wheel, trip means mounted upon said frame operable when actuated to open said seed trap to dispense seeds from said trap, and steplessly variable speed transmission mean drivingly coupling said trip means to said ground engaging wheel for periodically actuating said trip means at variable cyclic rates of actuation relative to the rate of rotation of said ground engaging wheel to thereby vary the distance travelled by said planter between successive actuations of said trip means.

References Cited in the file of this patent

UNITED STATES PATENTS

| | | |
|---|---|---|
| 731,243 | Swilling | June 16, 1903 |
| 1,864,691 | Hronek | June 28, 1932 |
| 2,505,499 | Lewis | Apr. 25, 1950 |
| 2,668,638 | Joy | Feb. 9, 1954 |
| 2,745,297 | Andrus | May 15, 1956 |
| 2,891,772 | Schiebel | Aug. 6, 1957 |